United States Patent Office 3,396,593
Patented Aug. 13, 1968

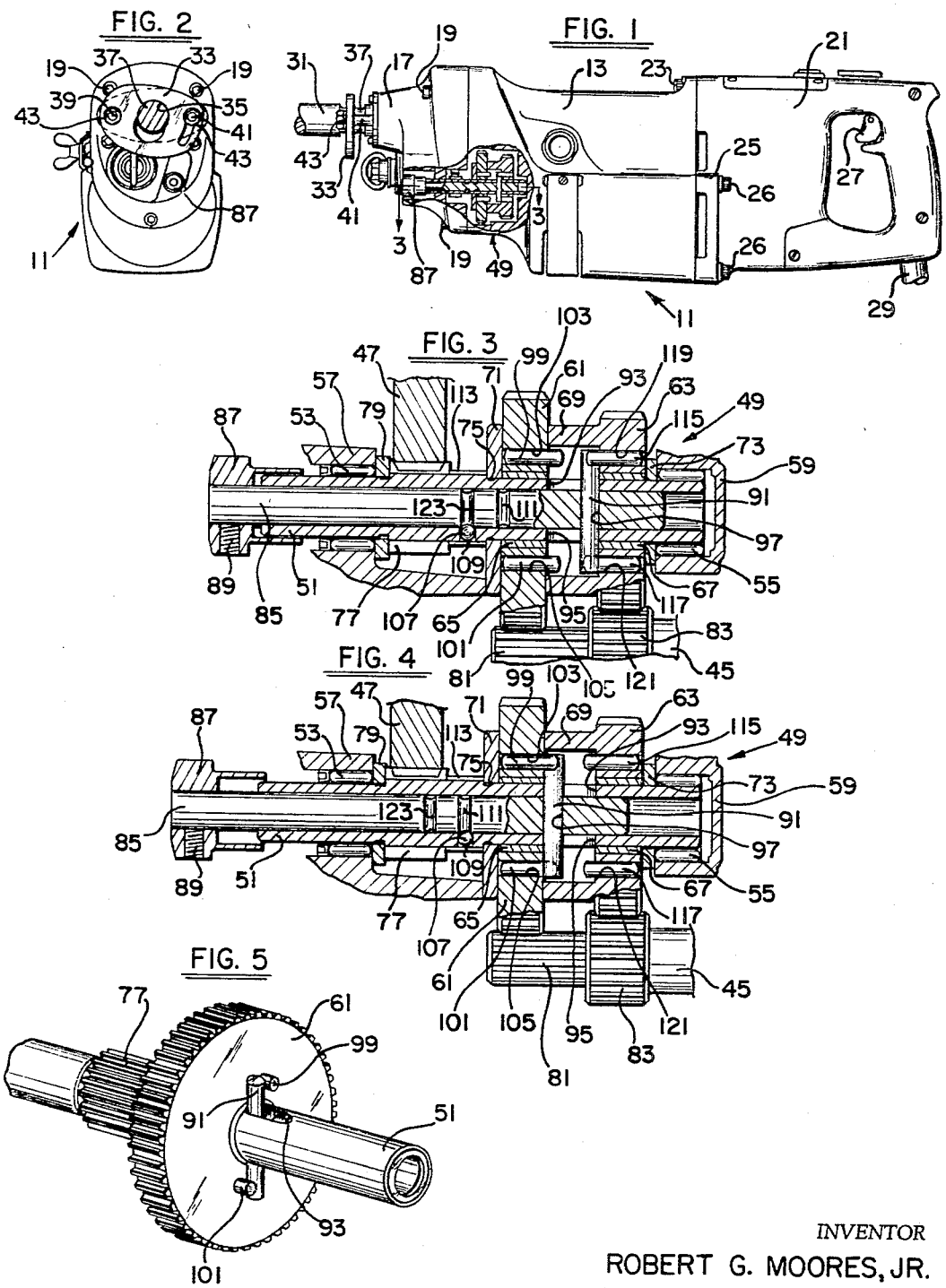

3,396,593
TRANSMISSION AND CLUTCH FOR ROTARY TOOL
Robert G. Moores, Jr., Cockeysville, Md., assignor to The Black and Decker Manufacturing Company, Towson, Md., a corporation of Maryland
Filed Aug. 1, 1966, Ser. No. 569,332
6 Claims. (Cl. 74—371)

ABSTRACT OF THE DISCLOSURE

The device disclosed herein is a power operated tool, such as a rotary hammer, which includes a two-speed transmission adapted to interconnect and transmit rotation from a motor to a tool bit. The transmission includes two pairs of interconnected drive and driven gears and manually shiftable means to selectively interconnect one or the other driven gear to an output shaft in turn drivingly connected to the tool bit. The shiftable means is integrated with the output shaft in a manner affording utmost simplicity and compactness and, in addition, does not restrict or restrain free movement of the transmission parts.

---

This invention relates generally to transmissions for power operated units, and particularly to an improved transmission and clutch for use in high vibration units such as rotary hammer devices.

An important object of the present invention is to provide an improved transmission and clutch device for high vibration, rotary tools which is adapted to selectively couple a rotatable input and output of the tool in multi speed ratio relationships.

Additional objects of the present invention include the provision of an improved transmission and clutch device of the above character wherein the clutch is positive acting and is not disengaged by the developed vibrational forces.

Further objects of the present invention include the provision of an improved transmission and clutch device of the above character wherein the clutch is adapted for easy manual manipulation and is provided with removable and replaceable components.

Still further objects of the present invention include the provision of an improved transmission and clutch device of the above character which is relatively inexpensive to manufacture, rugged in construction and reliable in use.

Other objects and advantages of the present invention will become more apparent from a consideration of the following detailed description taken in conjunction with the drawings in which:

FIG. 1 is a side elevational view, partly in section, illustrating a power operated rotary hammer embodying the present invention;

FIG. 2 is an end view of FIG. 1;

FIG. 3 is an enlarged sectional view of FIG. 1 taken along the line 3—3 thereof and showing the parts positioned for high-speed tool operation;

FIG. 4 is a view similar to FIG. 3 showing the parts positioned for low-speed tool operation; and FIG. 5 is a perspective view illustrating a portion of the structure of FIG. 4.

Broadly described, the present invention includes, in a rotary tool, a rotatable input means, a rotatable output means adapted for operative connection to a rotary tool means, transmission means interconnecting said input and output means, said transmission means comprising a shaft drivingly interconnected with said output means, first and second gear means rotatably mounted on said shaft and drivingly interconnected with said input means, driving lug means removably carried by said first and second gear means, driven lug means rotatable with said shaft and movable axially thereof from a first position in driven engagement with said driving lug means on said first gear means to a second position in driven engagement with said driving lug means on said second gear means.

Referring now more specifically to the drawings, a rotary hammer, which is one type of power operated device with which the present invention finds particular use, is shown embodying the present invention and is illustrated generally at 11 in FIGS. 1 and 2. The rotary hammer 11 is seen to include a case housing 13 having an end housing 17 secured thereto by screws 19. An end handle and gear case 21 is fixed to the case housing 13 by screws 23 and is provided with lateral flanges 25 also fixed to the case housing 13 by screws 26. The handle and gear case 21 has a trigger switch 27 and a conventional line cord 29, and the handle 21 together with the housings, 13, 17 may be constructed from a die cast aluminum alloy or may be molded using a suitable glass fiber material as is customary.

The rotary hammer 11 is provided with a conventional electric motor (not shown) or other power source, positioned within the lower portion of the case housing 13 and which is adapted to impart longitudinal reciprocating movement to a tool bit 31. For example, an electric motor having field windings and a rotating armature connected to a piston and floating ram by a gear and crank transmission can be employed to hammer on the tool bit 31. One such construction is illustrated and described in detail in U.S. Patent No. 3,203,490, granted Aug. 31, 1965 to G. W. McCarty et al. and owned by the assignee of the present application, and for a better understanding thereof, reference may be made thereto.

A tool retainer plate 33 is provided with a central aperture 35 receiving a reduced diameter portion 37 of the tool bit 31 and is carried upon the end housing 17 by a pair of resiliently mounted piston-like rods 39, 41. The rods 39, 41 are fixed to the plate 33 by nuts 43 threaded on the ends of the rods 39, 41. The retainer plate 33 functions to prevent the tool bit 31 from pulling out of the end housing 17 and cushions reciprocating movement thereof. For a detailed description of the retainer plate 33 and its resilient mounting, reference may be made to applicant's copending application Ser. No. 579,260 filed Sept. 14, 1966 and owned by the assignee of the present application.

In addition to reciprocating movement, the tool bit 31 is adapted for high and low speed rotation about its longitudinal axis. To this end, the electric motor armature has an armature shaft 45 extending forwardly thereof toward the end housing 17 and supported by ball bearings (not shown). The armature shaft 45 is connected to a gear 47 through a novel transmission and clutch drive 49. The gear 47 in turn may be directly connected to the tool bit 31 by having a hexagonal socket (not shown) receiving a hexagonal shank (not shown) integral with or otherwise suitably fixed to the tool bit 31. Alternatively, the gear 47 may be connected to another gear (not shown) through a slip clutch mechanism (not shown), the latter gear being directly connected to the tool bit 31 as illustrated and described in the McCarty et al. patent referred to above. It will be appreciated, however, that other types of conjoint rotation connections between the gear 47 and the tool bit 31 may be provided and the type referred to is for illustration only.

As shown in FIGS. 3 and 4, the transmission and clutch device 49 includes a hollow shaft 51 rotatably supported by needle bearings 53, 55 carried within bosses 57, 59 formed in the end housing 17 and the case housing 13, respectively. A pair of gears 61, 63 are rotatably supported on the hollow shaft 51 by sleeve bearings 65, 67 pressed in the gears 61, 63, respectively, and the gear 63 is provided with an integral, cylindrical extension 69 which abuts one face of the gear 61. A pair of washers 71, 73 are carried by the hollow shaft 51 and are positioned between the gear 61 and a shoulder 75 on the shaft 51, and between the gear 63 and the case housing boss 59, respectively, to hold the gears 61, 63 against axial movement on the shaft 51 and the latter against axial movement toward the right as seen in FIGS. 3 and 4. A pinion 77 is formed on the hollow shaft 51 forwardly of the gear 61 and drivingly engages the gear 47. A washer 79 is positioned between the pinion 77 and the boss 57 on the end housing 17 to prevent axial movement of the shaft 51 toward the left as seen in FIGS. 3 and 4.

The armature shaft 45 has a first pinion 81 formed on its forward end and a second pinion 83 pressed thereon rearwardly of the pinion 81. The pinions 81, 83 drivingly engage the gears 61, 63 and rotate the latter on the hollow shaft 51 at different speeds determined by the tooth number ratio between the pinion 81 and gear 61, and between the pinion 83 and gear 63, respectively. According to the present invention, a novel clutch is adapted to selectively couple the gears 61, 63 to the hollow shaft 51 and therefore drive the gear 47 and the tool bit 31 at different rotational speeds. Thus, when the gear 61 is coupled to the hollow shaft 51, the tool bit 31 rotates at a relatively slower speed than when the gear 63 is so coupled since the tooth number ratio of the pinion 81 to the gear 61 is less than the ratio of the pinion 83 to the gear 63.

The selective coupling structure for the gears 61, 63 and the hollow shaft 51 is seen in FIGS. 3 and 4 to include a manipulating rod 85, slidably disposed in the hollow shaft 51. The rod 85 has a knob 87 secured to the forward or outer end thereof by a set screw 89 and carries a driven lug 91 extending radially outwardly thereof and through axially elongated slots 93, 95 in the hollow shaft 51. The driven lug 91 is conveniently in the form of a bearing roller pressed through a diametral opening 97 in the rod 85 and has both ends thereof extending freely into the cavity defined by the cylindrical projection 69 on the gear 63.

At least one and preferably a pair of driving lugs 99, 101 are pressed into axial openings 103, 105 in the gear 61 which openings are spaced apart substantially 180°. The driving lugs 99, 101 also can be formed from bearing rollers and extend within the cylindrical gear extension 69. Thus, the driving and driven lugs and the rod 85 are in a substantially closed cavity and cannot become contaminated by dirt, grease or other foreign matter.

When the rod 85 is moved toward the left to the position shown in FIG. 4, the driven lug 91 is adapted to cooperate with the driving lugs 99, 101 so that with the parts in this position, the gear 61 is coupled to the hollow shaft 51 and the tool bit 31 is rotated at the relatively slow speed. To hold the rod 81 in this position, a ball detent 107 carried within a radial opening 109 in the hollow shaft 51 is resiliently pressed into a surface groove 111 in the rod 85 by a spring band 113.

The gear 63 also has at least one and preferably a pair of driving lugs in the form of bearing rollers 115, 117 pressed into axial openings 119, 121 spaced apart in the gear substantially 180°. The driving lugs 115, 117 extend within the cylindrical extension 69 and are adapted to cooperate with the driven lug 91 when the shaft 85 is moved toward the right to the position shown in FIG. 3. With the parts in this position, the gear 63 is coupled to the hollow shaft 51 and the gear 61 uncoupled so that now the tool bit 31 rotates at a relatively high speed. Also, in this position the detent ball 107 is received in another surface groove 123 in the rod 85 and prevents the rod 85 from inadvertently moving out of this position.

As shown in FIGS. 1 and 2, the knob 87 is located outside the end housing 17 for easy manual manipulation of the rod 85. Importantly, all of the transmission gears are in constant mesh relation and the lug 91 is positionable in its two selective positions without great regard for the angular relation of the clutch parts. Also, the transmission gears are supported axially within the housings 13, 17 so that vibrational forces arising from tool bit impact during use are absorbed by the housings. Furthermore, and perhaps most importantly, the clutch lugs 91, 99, 101, 115 and 117 are all conveniently formed from conventional, mass produced articles (bearing rollers), do not require special adaptations except to form the holes in the gears 61, 63 and are integrated with the transmission as well as being removable and replaceable should any of them become worn or broken during use.

By the foregoing, there has been disclosed an improved transmission and clutch device for multi-speed power units, and while a preferred embodiment of the present invention has been illustrated and described above in detail, various additions, substitutions, modifications and omissions may be made thereto without departing from the spirit of the invention as encompassed by the appended claims.

I claim:

1. In a rotary tool, a rotatable input means, a rotatable output means adapted for operative connection to a rotary tool means, transmission means interconnecting said input and output means, said transmission means comprising a hollow shaft drivingly interconnected with said output means, rod means slidably disposed in said shaft, first and second gear means rotatably mounted on said shaft and drivingly interconnected with said input means, driving lug means carried by said first and second gear means, a single driven lug means carried by said rod means and extending through elongated opening means in said shaft, said driven lug means rotatably interconnecting said rod means and said hollow shaft, said driven lug means being movable axially of said shaft through said elongated opening means and with said rod means from a first position in driven engagement with said driving lug means on said first gear means to a second position in driven engagement with said driving lug means on said second gear means, one of said first and second gear means being provided with an axial sleeve extension spaced radially from said hollow shaft and engageable with the other of said first and second gear means, said driving and driven lug means positioned within said extension.

2. A device as defined in claim 1 which includes detent means on said shaft and said rod means cooperable to hold said rod and said driven lug in said first and second positions.

3. A device as defined in claim 1 wherein each said driving lug means includes cylindrical, roller like members pressed into axial openings in said first and second gear means.

4. A device as defined in claim 1 wherein each said driving lug means includes a pair of lugs spaced apart substantially 180° on said first and second gear means.

5. A device as defined in claim 1 wherein said driven lug means includes a cylindrical, roller like member pressed through an opening in said rod means.

6. A device as defined in claim 1 wherein said rod means is adapted to extend outwardly of a housing encasing said tool for manual manipulation.

References Cited

UNITED STATES PATENTS

| | | | |
|---|---|---|---|
| 2,501,415 | 3/1950 | Shampaine | 192—48 |
| 2,942,490 | 6/1960 | Riley et al. | 74—370 |
| 3,175,568 | 3/1965 | Kafka | 192—48 |
| 3,178,956 | 4/1965 | Stanley | 74—369 |

FOREIGN PATENTS 1,173  1/1906  Great Britain.

FRED C. MATTERN, Jr., *Primary Examiner.*

H. S. LAYTON, *Assistant Examiner.*